United States Patent
Lv et al.

(10) Patent No.: US 6,980,442 B2
(45) Date of Patent: Dec. 27, 2005

(54) 384X-BASED BURST MODE PWM CONTROLLER

(75) Inventors: Shu Zhuang Lv, Shanghai (CN); Xu Guang Zhang, Shanghai (CN); Xin Wu, Shanghai (CN)

(73) Assignee: BCD Semiconductor Manufacturing Limited, Grand Cayman (KY)

( * ) Notice: Subject to any disclaimer, the term of this patent is extended or adjusted under 35 U.S.C. 154(b) by 0 days.

(21) Appl. No.: 11/036,041

(22) Filed: Jan. 18, 2005

(65) Prior Publication Data

US 2005/0185427 A1  Aug. 25, 2005

(30) Foreign Application Priority Data

Feb. 19, 2004  (CN) .......................... 2004200023842

(51) Int. Cl.$^7$ ............................................ H02M 3/335
(52) U.S. Cl. .................. 363/21.1; 363/21.18
(58) Field of Search .................... 363/21.04, 21.05, 363/21.1, 21.12, 21.13, 21.18, 26, 41, 97, 363/131

(56) References Cited

U.S. PATENT DOCUMENTS

| | | | | |
|---|---|---|---|---|
| 4,740,879 A | * | 4/1988 | Peruth ......................... | 363/131 |
| 5,313,381 A | * | 5/1994 | Balakrishnan ............... | 363/147 |
| 5,995,384 A | * | 11/1999 | Majid et al. .............. | 363/21.18 |
| 6,208,538 B1 | * | 3/2001 | Halamik et al. .............. | 363/41 |
| 6,307,356 B1 | * | 10/2001 | Dwelley ....................... | 323/282 |
| 6,822,884 B1 | * | 11/2004 | Rosenthal et al. ............ | 363/59 |
| 6,856,519 B2 | * | 2/2005 | Lin et al. ...................... | 363/16 |
| 6,879,501 B2 | * | 4/2005 | Mori ....................... | 363/56.03 |

* cited by examiner

Primary Examiner—Adolf Berhane
(74) Attorney, Agent, or Firm—Birch, Stewart, Kolasch & Birch, LLP

(57) ABSTRACT

A 384X-based burst mode PWM controller includes an oscillator to generate a pulse signal of a constant frequency, an output circuit to generate an output signal based on the pulse signal, an error amplifier to generate an amplified error signal, a logic control current source connecting to a current sense input of a comparator, the comparator which compares the voltage of the current sense input with the voltage of the error signal to generate a comparison signal, a PWM latch to generate a pulse control signal corresponding to the pulse signal and based on the comparison signal. The pulse control signal controls the output circuit and the logic control current source in opposite conditions of turning on and off. The controller can replace 384X directly and save energy.

5 Claims, 5 Drawing Sheets

384X-BASED BURST MODE PWM CONTROLLER

FIELD OF THE INVENTION

The present invention relates to a pulse width modulation (PWM) technique and particularly to a 384X-based burst mode PWM controller.

BACKGROUND OF THE INVENTION 384X series PWM controller is an industrial standard IC for power supply control, and it is widely used in AC-to-DC switching power supply for electronic products such as computes, TVs, DVDs.

The household appliances and office equipments used by people in life and work every day generally employ switching power supplies. The light load and standby mode functions are a big issue and have received a lot of attention from government institutions. In U.S.A. there is a government decree in Jul. 2001 ordering electric equipment procured by government institutions ought to have standby power loss less than 1 W. The environmental protection organizations in other countries also set up similar plans and standards. For instance, the "Energy-star" of U.S.A and "Blue Angel" of Germany are standards adopted by a growing number of areas.

Chinese government also takes a serious look on the energy conservation issue. Energy saving procurement is a policy actively implemented. And China Energy Saving Product Authentication Center also embarks a series of research projects. The first one is the energy conservation authentication project for standby power consumption of color TV. It plans to target two to three products every year for energy conservation authentication, including video products such as DVD, VCD and business machines such as printer, facsimile machine, computer and the like. Hence how to reduce the standby power loss of the product has become an important research subject for most power supply manufacturers. The research of chip manufacturing for reducing power loss under light loads and standby mode has some progresses. A few known semiconductor manufacturing companies have introduced green low power consumption power supply control chips, such as NCP120X series of Onsemi, FAN7601 of Fairchild, ICE2AS01 of Infineon, TEA1533 of Philips, SG684X series of System General, and the like.

Most power supply users now use 384X controllers. They urgently need a new chip that can save energy to replace the 384X chip. However, the chips mentioned above do not equip such a capability.

FIG. 5 illustrates the block diagram of a conventional 384X controller 500. The automatic circuit 102 has a power supply input 7 to receive the input of an external power supply and a ground end 5 to provide electric power to a voltage reference circuit 104. The voltage reference circuit 104 provides an accurate reference voltage for a logic control circuit 106 and an error amplifier 112, and outputs the reference voltage to an external circuit through a reference voltage output end 8. The logic control circuit 106 receives the reference voltage to generate a logic control signal.

There is an oscillator 4 with a control input end 4 which receives a control signal from the external circuit. A pulse signal of a constant frequency is generated based on the control signal. The pulse signal is provided to an output circuit 110. The control input end 4 is connected to a resistor and a capacitor (shown by 409 and 410 in FIG. 4) to alter the constant frequency and the maximum duty cycle of the pulse signal. The output circuit 110 has a power supply input end 7, a ground end 5 and a signal output end 6. The power supply input end 7 receives an output of the external power supply, and generates an output signal based on the logic control signal generated by the logic control circuit 106 and the pulse signal generated by the oscillator 108 to provide the external circuit through the signal output end 6.

The error amplifier 112 has a compensated output end 1 and a voltage feedback input end 2. When in use, the ports of 1 and 2 are bridged by an external resistor and a capacitor in a parallel manner (shown by 405 and 406 in FIG. 4) to compensate gain and frequency. The error amplifier 112 generates an amplified error signal based on the reference voltage of the voltage reference circuit 104 and the voltage feedback signal output by the external circuit received by the voltage feedback input end 2. A comparator 114 provides a current sense input 3 to compare a current sense signal voltage fed to the current sense input 3 by the external circuit and the voltage of the amplified error signal to generate a comparison signal which is provided to a PWM latch 116. The PWM latch 116 corresponds to the comparison signal and the pulse signal transferred from the oscillator 108 to generate a pulse control signal. The potential of the pulse control signal determines the output circuit 110 on and off.

During operation, when the system starts in a normal condition and carries a load, the signal voltage at the current sense input 3 of the comparator 114 rises gradually from zero. The input signal voltage at another end of comparator 114 is provided by the error amplifier 112 according to the voltage feedback signal output by the external circuit. The error signal voltage of the error amplifier 112 is greater than the voltage of current sense signal. The comparator 114 generates a comparison signal based on the comparison result and provides to the PWM latch 116. The PWM latch 116 may be a RS trigger with a control end to receive the pulse signal of the oscillator 108 and another control end to receive the comparison signal of the comparator 114. When the pulse of the oscillator 108 is activated, the PWM latch 116 generates a pulse control signal based on the comparison signal to turn on the output circuit 110. Thereby the output circuit 110 outputs the pulse signal from the oscillator 108 to the external circuit. When the voltage of the current sense signal rises and is greater than the voltage of the error signal, the comparator 114 reverses, the pulse control signal condition generated by the PWM latch 116 also changes, such as from a high potential to a low potential, to turn off the output circuit 110. The current sense signal becomes zero. As the voltage feedback signal output by the external circuit still exists, the error signal of the error amplifier 112 also exists. Meanwhile, the voltage of the current sense signal is smaller than the voltage of the error signal. The comparator 114 is reversed again. When the pulse of the oscillator 108 reaches the PWM latch 116, the output circuit 110 turns on again to complete an on-and-off cycle. A number of on-and-off cycles are repeated. As the time of turning off the output circuit 110 is very short, the waveform of the output signal forms a continuous pulse wave. Such an operation fashion is called the PWM mode.

When the system is in a light load or a standby condition, the error signal generated by the error amplifier 112 is smaller when the load is carried, then the time of the voltage of the current senseing signal risen and greater than the voltage of the error signal is shortened, PWM duty cycle is also shortened. The output waveform is still a continuous pulse waveform same as in the PWM mode at a smaller duty cycle with the frequency same as the oscillator 108. Energy consumption is no big different from the normal operation condition. The present invention aims to provide an energy-saving controller on this basis.

SUMMARY OF THE INVENTION

The present invention aims to provide a burst mode PWM controller based on the background mentioned above.

The present invention is a 384X based burst mode PWM controller. It includes an oscillator to generate a pulse signal of a constant frequency, an output circuit to generate an output signal based on the pulse signal and send the output signal to an external circuit, an error amplifier to receive a voltage feedback signal from the external circuit and generate an amplified error signal, a comparator which has a current sense input on one end to receive the current sense signal voltage of the external circuit and another end to receive the amplified error signal and compare the current sense signal voltage with the amplified error signal voltage to generate a comparison signal, and a PWM latch to respond to the pulse signal and generate a pulse control signal based on the comparison signal. The pulse control signal controls the output circuit on and off. When the voltage of the current sense signal is smaller than the voltage of the error signal, the output circuit turns on. When the voltage of the current sense signal is greater than the voltage of the error signal, the output circuit turns off. The burst mode PWM controller further includes a logic control current source which has an output end connecting to the current sense input of the comparator. The pulse control signal generated by the PWM latch controls the logic control current source and the output circuit on and off in opposite conditions.

When in use for switching AC-DC, on the one hand, the output voltage is feedback to check alteration of the load, and is feedback to the error amplifier of the burst mode PWM controller through a photoelectric coupler. On the other hand, when the controller outputs a pulse to set ON a power tube, the peak current passing through the primary coil of the switching power supply transformer is detected through a sense resistor. When the controller turns off the output to set off the power tube, the internal current of the controller generates a corresponding voltage that is sent to the comparator to change the output condition thereof. Therefore the light load or the standby burst mode may be achieved to save energy.

The burst mode PWM controller of the invention is a green power supply controller to replace the standard 384X series PWM controllers. Users do not have to change the configuration of the peripheral elements of the original application system to achieve the benefit of low energy consumption in the light load or the standby condition. It conforms to the international green power supply standards such as Blue angel and Energy-start standards. The controller thus constructed can directly substitute 384X controller and achieve energy saving.

The foregoing, as well as additional objects, features, and advantages of the invention will be more readily apparent from the following detailed description, which proceeds with reference to the accompanying drawings.

DETAILED DESCRIPTION OF THE PREFERRED EMBODIMENTS

Figure 1:
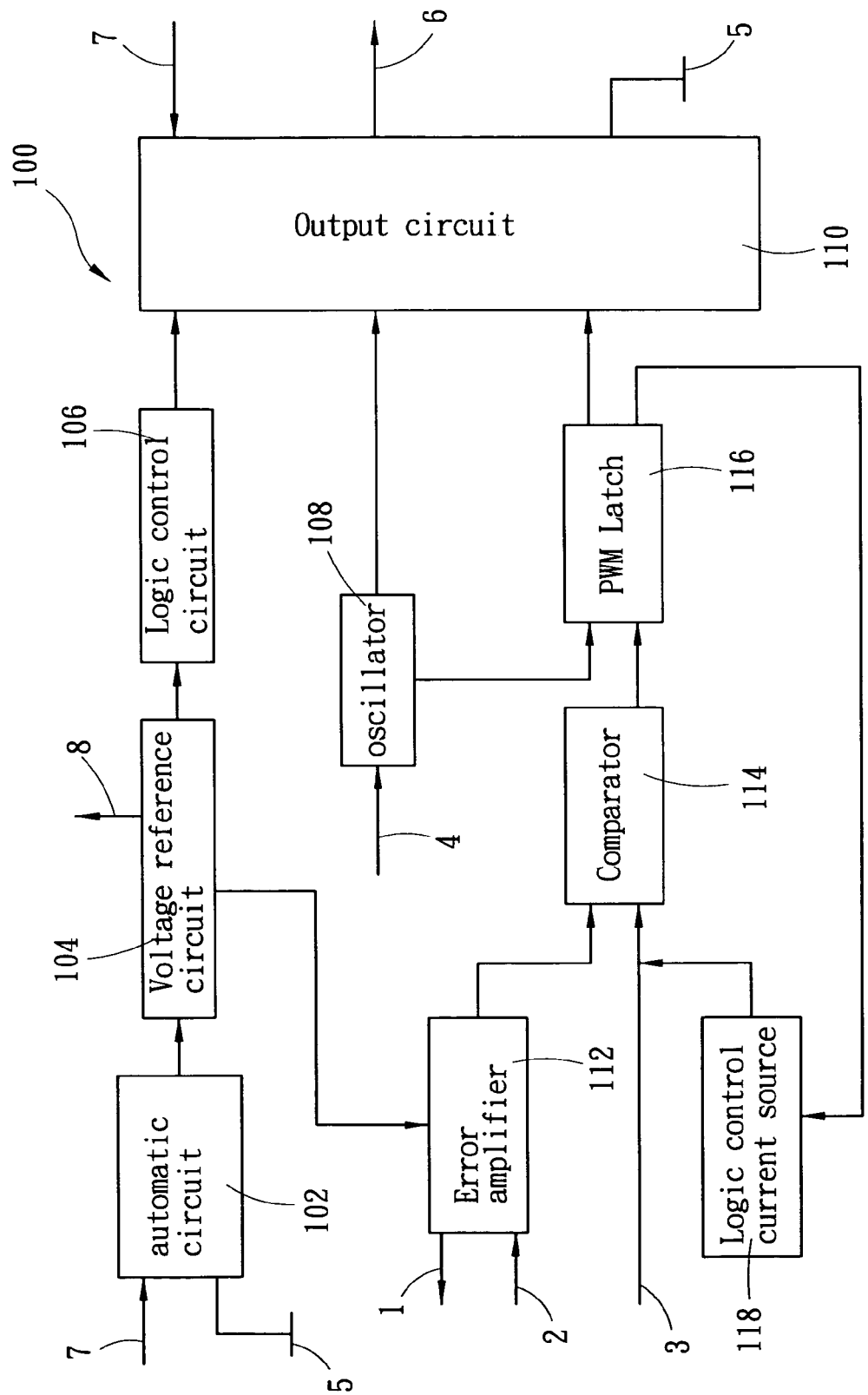
FIG. 1 is an internal block diagram of an embodiment of the burst mode PWM controller of the present invention.

Please refer to FIG. 1 for the internal block diagram of an embodiment of the burst mode PWM controller of the present invention. Compare with the conventional 384X controller, the controller of the invention adds a logic control current source 118. The input and output ports have no changes. In an embodiment of the invention, when the logic control current source 118 is activated, it generates a voltage through external resistors (shown by Rf and Rs in FIGS. 2 and 4) to provide the comparator 114. The comparator 114 compares the voltage of the current sense input 3 and the error signal voltage of the error amplifier 112 to generate a comparison signal. The PWM latch 116 generates a pulse control signal at a potential to turn on and off the output circuit 110 and the logic control current source 118. The conditions of turning on and off the output circuit 110 are opposite to the logic control current source 118.

Figure 2:
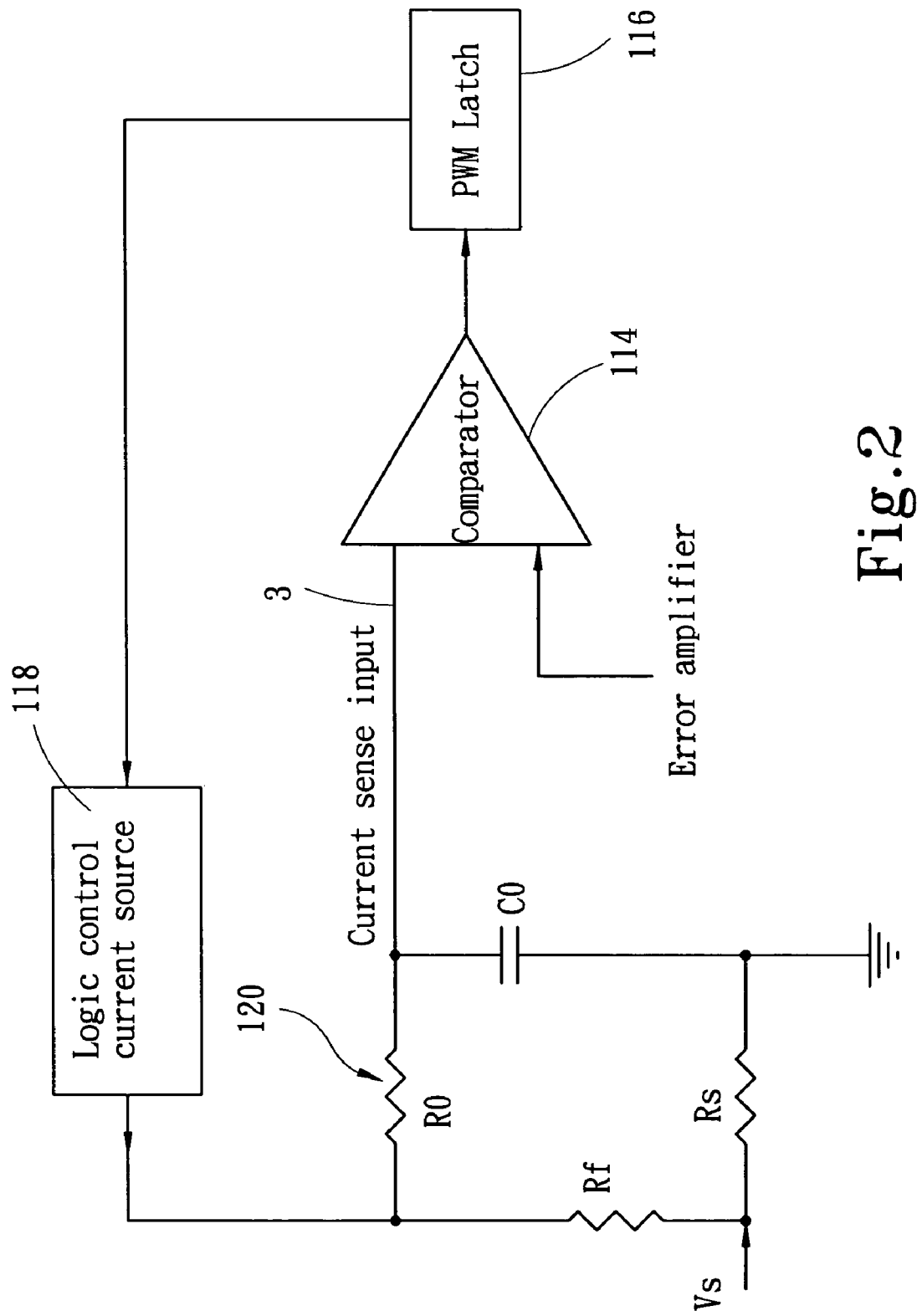
FIG. 2 is a fragmentary circuit diagram of an embodiment of the present invention to implement burst mode mode.
Figure 3:
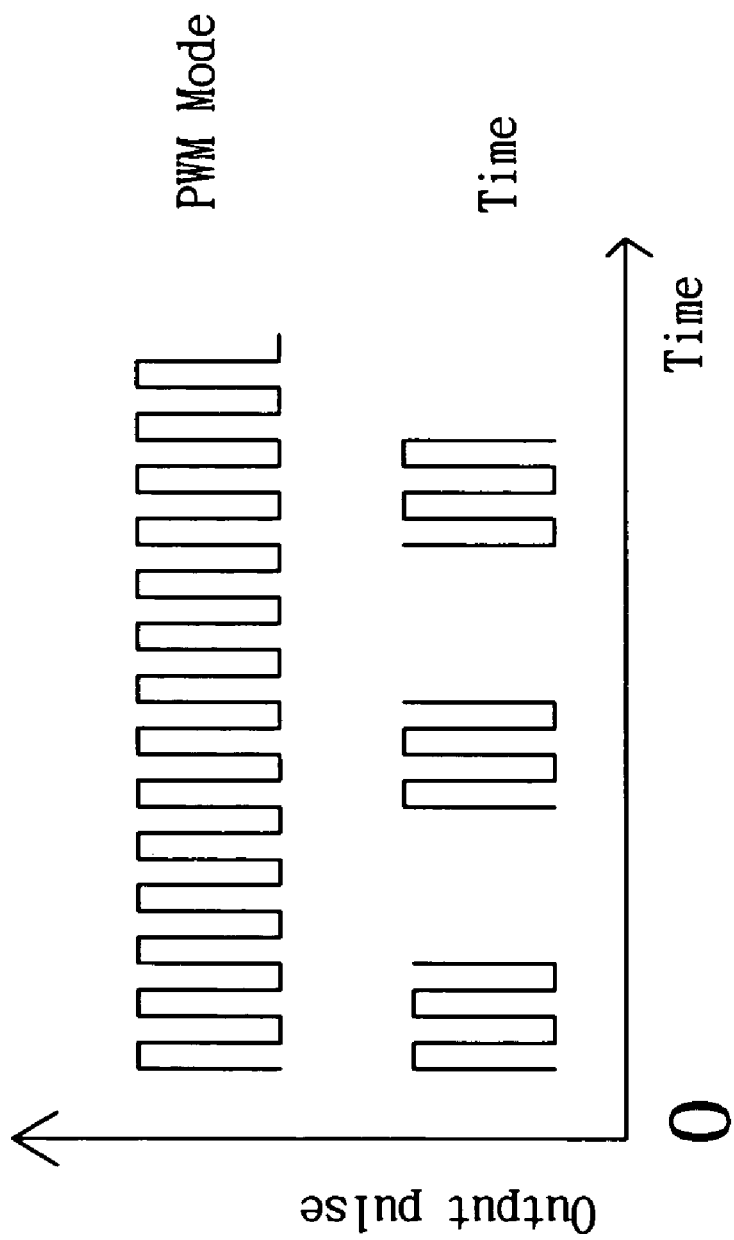
FIG. 3 is a chart showing output waveform comparison of the PWM mode and the burst mode mode.

Referring to FIG. 2, when the embodiment is in operation and the system carries a normal load, if the error signal voltage of the error amplifier 112 is greater than the voltage of the current sense signal, the PWM latch 116 generates a pulse control signal of a high potential to turn on the output circuit 110 but turn off the logic control current source 118, thereby the output circuit 110 sends the pulse signal from the oscillator 108 to the external circuit. When the voltage of the current sense signal is greater than the error signal voltage, the pulse control signal generated by the PWM latch 116 changes from the high potential to a low potential to turn off the output circuit 110 and turn on the logic control current source 118. But in the load carrying condition, the voltage VS is higher, the logic control current source 118 cannot flow to the external RF and RS network, thus is not effective. The controller 100 is in a normal PWM operation condition, and the waveform of the output signal is a continuous pulse waveform as shown in FIG. 3.

In the light load or the standby condition, when the voltage of the current sense signal rises and is greater than the error signal voltage, the pulse control signal of the PWM latch 116 changes to a low potential to open the logic control current source 118 and close the output circuit 110. Meanwhile, the system voltage VS is very low in the light load or the standby condition, the logic control current source 118 generates current flowing through RF and RS to generate a voltage value which is applied to the current sense input 3 of the comparator 114 through a RC filter network 120 consisting of R0 and C0 (it is to be noted that the RC filter network is not mandatory). Thus the signal voltage of the current sense input 3 does not drop to zero because of turning off the output circuit 110. On the other hand, the error signal voltage generated by the error amplifier 112 is smaller when carrying the load, but the signal voltage at the current sense input is still greater than the error signal voltage, the comparator 114 does not reverse, and the pulse control signal of the PWM latch 116 maintains at the low potential, the output circuit 110 and the logic control current source 118 maintains respectively in an on-and-off condition, the output signal becomes a zero signal. As time moves on, the external output voltage decreases, the error signal voltage generated by the error amplifier 112 gradually increases; after a period of time, the error signal voltage is greater than the signal voltage of the current sense input, and the comparator 114 is reversed, the pulse control signal changes from the low potential to the high potential, and the output circuit 110 turns on, while the logic control current source 118 turns off, and the controller 100 outputs again a pulse waveform. The cycle set forth above is repeated, and the output waveform looks like jumping over many switching cycles and becomes a serial of pulses at a constant frequency as shown in FIG. 3. This can reduce switchinging loss. And such an operation is called the burst mode mode. It is known to those skilled in the art that the control signal may be low potential or high potential. In the aforesaid embodiment, when the error signal voltage is greater than the signal voltage of the current sense input 3, the pulse control signal may be low potential, and the pulse control signal turns on the output circuit 110 and turns off the logic control current source 118. This should be within the scope of the invention.

The controller 100 may also include an overheat protection circuit connecting to the oscillator 108. It may be a thermostat. When the internal temperature exceeds 150.degree.C., the overheat protection circuit stops the operation of the oscillator 108. When the temperature drops to 130.degree.C., the overheat protection circuit resumes the operation of the oscillator 108.

Figure 5:
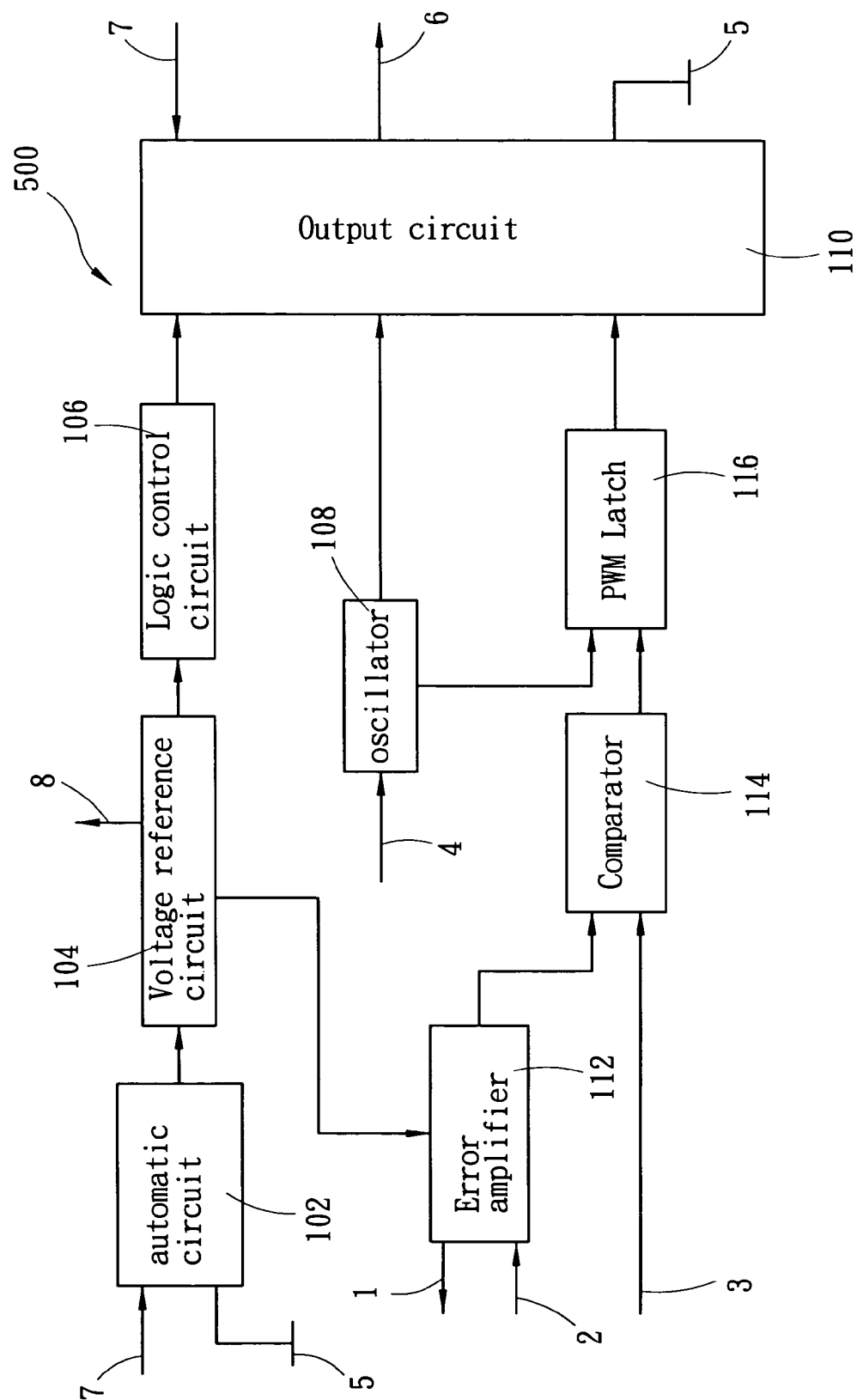
FIG. 5 is an internal block diagram of a conventional 384X controller.

Referring to FIGS. 1 and 5, the input and output ends of the PWM controller 100 (marked by numerals 1–8) are same as the conventional 384X controller. In the typical AC-DC applications, the controller 100 of the invention can replace the conventional controller without altering the configuration of the peripheral components and achieve energy saving effect.

Figure 4:
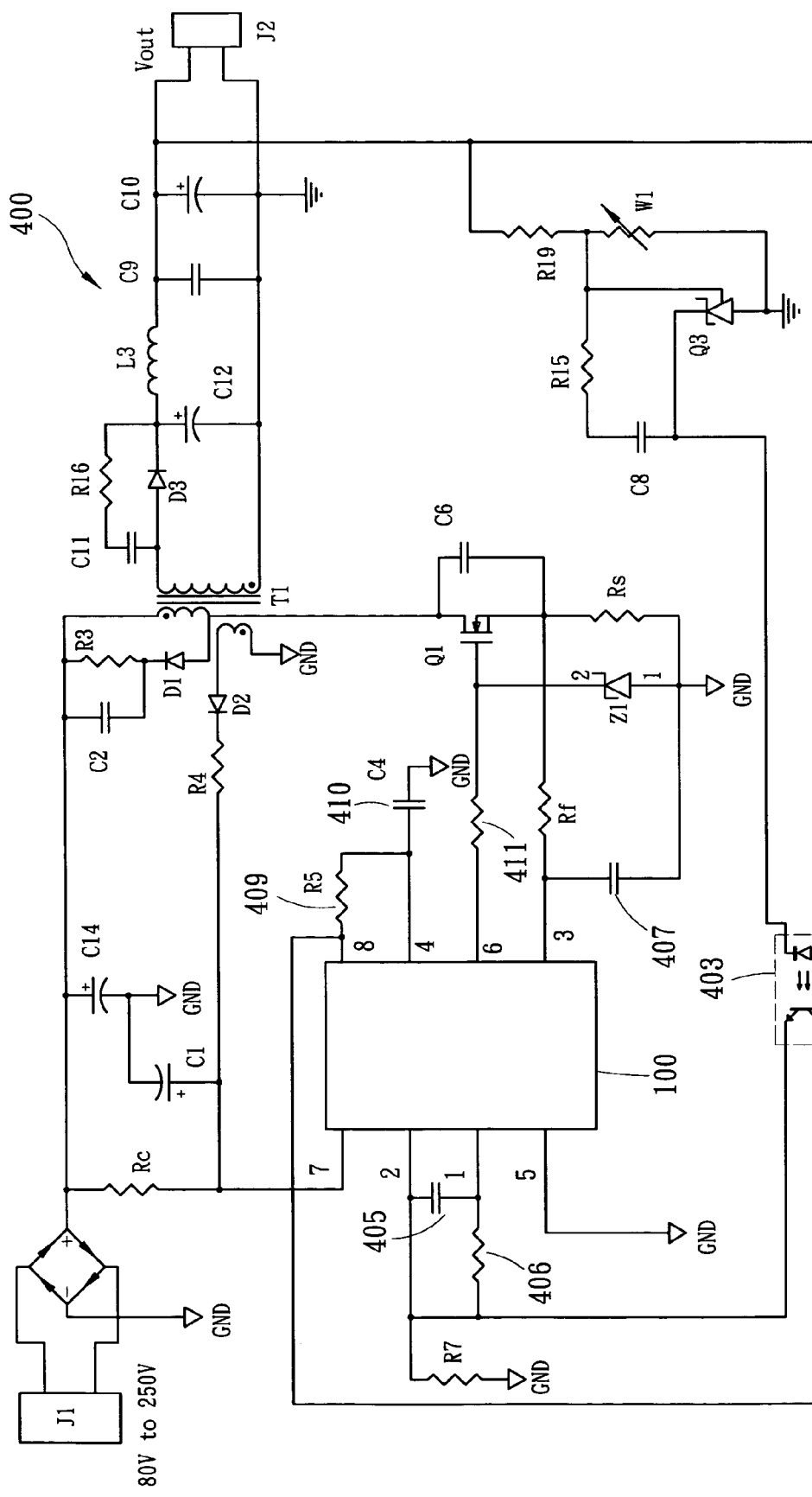
FIG. 4 is an application circuit diagram of the burst mode PWM controller of the invention.

Refer to FIG. 4 for a typical application circuit 400 of the burst mode PWM controller 100 of the invention. The pins serial numbers 1–8 correspond to input and output end number 1–8. The actuation resistor Rc aims to activate the circuit. The output pulse passes through a noise suppression resistor 411 to actuate a switching tube Q1. Output voltage Vout is feedback to the error amplifier 112 through a resistor 404, a photoelectric coupler 403 and the voltage feedback input end 2 of the controller 100. A capacitor 405 and a resistor 406 are gain and frequency compensation elements. The circuit set forth above forms an output voltage feedback control. In addition, the resistor Rs takes peak current sense input of the primary coil of a transformer T1, through a filter network (resistor Rf and capacitor 407) and the current sense input 3, feedback to the comparator 114 of the controller 100 to complete current feedback.

The burst mode mode of the system wherein the controller 100 resided can be implemented through the voltage feedback and the current feedback previously discussed. Moreover, the output power setting point in the burst mode mode is adjustable. By altering the filter network (resistor Rf and capacitor 407) and the output resistor and capacitor network (404 and C10), the system may be transferred to the power level of the burst mode mode.

Furthermore, the invention employs a special circuit structure so that when operating in a power supply system, the internal loss of the controller and thermal loss of the actuation resistor and dummy load are significantly lower than the standard 384X controllers now on the market.

What is claimed is:

1. A 384X-based burst mode PWM controller, comprising:

an oscillator for generating a pulse signal of a constant frequency;

an output circuit for generating an output signal based on the pulse signal and sending the output signal to an external circuit;

an error amplifier for receiving a voltage feedback signal from the external circuit and generating an amplified error signal;

a comparator having a current sense input on one end to receive a voltage of a current sense signal from the external circuit and another end to receive the amplified error signal, and comparing the voltage of the current sense signal with the voltage of the amplified error signal to generate a comparison signal; and a PWM latch for responding the pulse signal and generating a pulse control signal based on the comparison signal to control the output circuit on and off;

wherein the output circuit turns on when the voltage of the current sense signal is smaller than the voltage of the error signal; the output circuit turns off when the voltage of the current sense signal is greater than the voltage of the error signal;

wherein the burst mode PWM controller further including a logic control current source which has an output end connecting to the current sense input of the comparator;

wherein the pulse control signal generated by the PWM latch controls the logic control current source and the output circuit in opposite conditions of turning on and off.

2. The burst mode PWM controller of claim 1 further including:

an automatic circuit which has a power supply input end and a ground end to receive input of an external power supply;

a voltage reference circuit which has a reference voltage output end, the voltage reference circuit receiving power supply from the automatic circuit to generate a reference voltage which is the output to the external circuit through the reference voltage output end; and a logic control current circuit to receive the reference voltage of the voltage reference circuit to generate a logic control signal which is sent to the output circuit to control the output signal;

wherein the voltage reference circuit further sends the reference voltage to the error amplifier, the oscillator having a control input end to receive a control signal from the external circuit to generate the pulse signal, the output circuit having a power supply input end to receive input from an external power supply, a ground end and a signal output end to output an output signal to the external circuit, the error amplifier having a voltage feedback input to receive a voltage feedback signal from the external circuit and a compensation output connecting to the external circuit to compensate gain and frequency for the error amplifier.

3. The burst mode PWM controller of claim 1, further including a RC filter circuit which includes a resistor and a capacitor, the resistor bridging the output of the logic control current source and the current sense input of the comparator, the capacitor bridging the current sense input of the comparator and the ground.

4. The burst mode PWM controller of claim 1, wherein the PWM controller is a RS trigger.

5. The burst mode PWM controller of claim 1, further including a temperature protection device to protect the oscillator from overheating.

* * * * *